US009134789B2

(12) United States Patent
Cotlarciuc (10) Patent No.: US 9,134,789 B2
(45) Date of Patent: Sep. 15, 2015

(54) MULTI-LAYER COMPUTER APPLICATION WITH A TRANSPARENT PORTION

(75) Inventor: Razvan Cotlarciuc, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 1255 days.

(21) Appl. No.: 12/502,486

(22) Filed: Jul. 14, 2009

(65) Prior Publication Data

US 2014/0289650 A1  Sep. 25, 2014

(51) Int. Cl.
*G06F 3/048* (2013.01)
*G06F 3/01* (2006.01)
*G06F 3/0481* (2013.01)
*G06F 3/0484* (2013.01)
*G06F 3/0488* (2013.01)

(52) U.S. Cl.
CPC *G06F 3/01* (2013.01); *G06F 3/048* (2013.01); *G06F 3/0481* (2013.01); *G06F 3/0488* (2013.01); *G06F 3/04842* (2013.01)

(58) Field of Classification Search
CPC .. G06F 3/0481; G06F 3/0488; G06F 3/04842
USPC .......................................... 715/768, 790, 794
See application file for complete search history.

(56) References Cited

U.S. PATENT DOCUMENTS

| 5,617,114 | A * | 4/1997 | Bier et al. ...................... 345/634 |
| 5,805,163 | A * | 9/1998 | Bagnas ........................... 715/768 |
| 6,252,595 | B1 * | 6/2001 | Birmingham et al. ........ 715/803 |
| 6,529,910 | B1 | 3/2003 | Fleskes |
| 7,429,993 | B2 * | 9/2008 | Hui ................................. 345/629 |
| 7,559,034 | B1 * | 7/2009 | Paperny et al. ................ 715/803 |
| 7,783,983 | B1 * | 8/2010 | Mayers et al. ................. 715/764 |
| 7,913,177 | B1 * | 3/2011 | Smith et al. .................... 715/762 |
| 2001/0056370 | A1 * | 12/2001 | Tafla ................................ 705/14 |
| 2002/0016969 | A1 * | 2/2002 | Kimble ............................ 725/87 |
| 2002/0027570 | A1 * | 3/2002 | Muto et al. ..................... 345/782 |
| 2002/0104096 | A1 * | 8/2002 | Cramer et al. ................. 725/113 |
| 2002/0124022 | A1 * | 9/2002 | Yoo ................................. 707/513 |
| 2004/0093563 | A1 * | 5/2004 | Pasquali ......................... 715/513 |
| 2004/0172343 | A1 * | 9/2004 | Allibhoy et al. ................ 705/27 |
| 2004/0199603 | A1 * | 10/2004 | Tafla et al. ..................... 709/217 |
| 2004/0220963 | A1 * | 11/2004 | Chen et al. ................. 707/103 R |
| 2004/0255253 | A1 * | 12/2004 | Marcjan ......................... 715/789 |
| 2004/0261131 | A1 * | 12/2004 | Zigmond et al. .............. 725/136 |

(Continued)

OTHER PUBLICATIONS

U.S. Appl. No. 11/951,165, filed Dec. 5, 2007, Taylor.

(Continued)

*Primary Examiner* — Tuyetlien Tran
(74) *Attorney, Agent, or Firm* — Kilpatrick Townsend & Stockton LLP (57) ABSTRACT

An application in which a portion of a layer is transparent. When the application is a first state (with a first layer on top), a transparent portion of that layer may make a portion of a second layer visible. The first layer may include various menus and the second layer may have a feature that displays web page content in a position that overlaps the transparent portion of the first layer. In a second state, the second layer is rendered on top making the web page feature visible and accessible and, since nothing in the second layer overlays the menus, those menus are also visible and accessible. When needed, the application switches to a first state, for example, to expand a menu's display on top of (i.e., covering) some of the web content, while leaving the uncovered portion of the web content visible through the transparent portion.

20 Claims, 6 Drawing Sheets

(56) References Cited

U.S. PATENT DOCUMENTS

| | | |
|---|---|---|
| 2005/0108095 A1* | 5/2005 | Perlmutter ............... 705/14 |
| 2005/0114430 A1* | 5/2005 | Zheng et al. .............. 709/200 |
| 2005/0166158 A1* | 7/2005 | Blanchard et al. ......... 715/768 |
| 2005/0198315 A1* | 9/2005 | Wesley et al. ............. 709/228 |
| 2006/0059432 A1* | 3/2006 | Bells ........................ 715/768 |
| 2006/0117272 A1* | 6/2006 | Sawada et al. ............ 715/802 |
| 2006/0224697 A1* | 10/2006 | Norris ....................... 709/218 |
| 2007/0061721 A1* | 3/2007 | Bustelo et al. ............. 715/705 |
| 2007/0078846 A1* | 4/2007 | Gulli et al. ................. 707/5 |
| 2007/0233692 A1* | 10/2007 | Lisa et al. .................. 707/10 |
| 2008/0046562 A1* | 2/2008 | Butler ....................... 709/224 |
| 2008/0256467 A1* | 10/2008 | Chu et al. .................. 715/762 |
| 2008/0288976 A1* | 11/2008 | Carson et al. .............. 725/34 |
| 2008/0307308 A1* | 12/2008 | Sullivan et al. ............ 715/723 |
| 2009/0031246 A1* | 1/2009 | Cowtan et al. ............. 715/786 |
| 2009/0049385 A1* | 2/2009 | Blinnikka et al. .......... 715/719 |
| 2009/0204928 A1* | 8/2009 | Kallio et al. ............... 715/799 |
| 2010/0017737 A1* | 1/2010 | Berger ....................... 715/771 |
| 2010/0088623 A1* | 4/2010 | Ichino ....................... 715/766 |
| 2010/0210357 A1* | 8/2010 | Slough et al. .............. 463/30 |

OTHER PUBLICATIONS

U.S. Appl. No. 11/951,177, filed Dec. 5, 2007, Taylor.

* cited by examiner

MULTI-LAYER COMPUTER APPLICATION WITH A TRANSPARENT PORTION

FIELD

This disclosure generally relates to computer software that creates, edits, runs, displays, provides, or otherwise uses electronic content.

BACKGROUND

Computer applications can display content from different sources as part of a single application or other single piece of content. A web page, for example, can combine images, text, and other static and interactive content from various sources. For example, a web page can be provided as a HTML page containing multiple sibling HTML nodes. Similarly, various multimedia and application players play content that includes multiple pieces from multiple sources. For example, Adobe® Flash Player®, which is built into some web browsers and available as a plugin for others, can play SWF files to present Flash® movies that includes multiple pieces from multiple sources, as well as varying degrees of interactivity, animation, and other functionality, within the web browser. Unfortunately, various problems can prevent combined content from appearing as a single piece or single application. For example, in an application, tools may not properly overlay separately specified HTML content, preventing the tools and content from having a single application feel that may be expected by users.

SUMMARY

Systems and methods are disclosed for providing a computer application with content from one or more sources and other features. An exemplary application is provided as a multilayer application in which a portion of at least one of the layers is transparent. When the application is in a first state (with a first layer active), the various menus are visible and a transparent portion of that layer allows a portion of a second layer to also be visible. For example, the second layer may have a feature that displays web page content in a position that underlies the transparent portion of the first layer. In a second state, the second layer is active and the second layer content, e.g., the web page feature, is still visible and, since nothing in the second layer overlays the first layer menus, those menus are also visible. When needed, the application switches to a first state, for example, to expand a menu's display on top of (i.e., covering) some of the web content, while leaving the uncovered portion of the web content visible through the transparent portion.

An exemplary method provided in certain embodiments presents an interface on a computing device, the computing device comprising instructions embodied in a computer-readable medium which configure the computing device to display the interface. The interface has a first layer and a second layer, wherein the first layer has first layer content and a transparent area and the second layer has second layer content. The method further involves displaying a non-overlapping portion of the interface where the first layer and second layer do not overlap and displaying an overlapping portion of the interface where the transparent area of the first layer overlaps some or all of the second layer content. The method involves changing which layer of the interface is active to allow interaction with the first layer content and the second layer content. When the first layer is active, at least some of the first layer content is visible and, through the transparent portion, at least some of the second layer content is visible. When the second layer is active, at least some of the second layer content is visible and, in the non-overlapping portion, at least some of the first layer content is visible.

These exemplary embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Systems and methods are disclosed for providing a computer application with various enhanced features. An exemplary application is provided as a multilayer application in which a portion of at least one of the layers is transparent. For example, an application may have a first layer and a second layer. When the application is in a first state with the first layer displayed as the active layer (i.e., on top), a transparent portion of the first layer may allow a portion of the second layer to be visible. This type of application can provide various conveniences and other benefits especially if the application includes interactive content and/or combines content from one or more sources.

One example involves providing an Adobe® Flash® application that includes a first layer with various displayed menus, buttons, or other first layer features and at least one transparent portion. A second layer includes an encapsulated HTML node displaying a web page, interactive features, and/or other displayed second layer features. These displayed second layer features may be positioned to overlap some or all of the transparent portion of the first layer. In a second state, the second layer is active and thus rendered on top of at least some of the first layer. However, at least another portion of the first layer is still visible and accessible in the application. When needed, for example, to expand the display a menu from the first layer features over the second layer features, the application switches to a first state. In the first state, the first layer displayed as the active layer (i.e., on top) and the first layer features are visible and accessible. However, the transparent portion allows some or all second layer features to be visible.

Among other advantages, certain embodiments may, but do not necessarily, facilitate the display of first layer modal dialog boxes that are displayed above a portion of the second layer content. Certain embodiments may allow a user to view/ edit an independent piece of interactive content while viewing and accessing features that are separately defined for an application. Certain embodiments may also enhance a piece of content by facilitating combining the piece of content with other features or content without requiring that the piece of content itself change.

These illustrative examples and advantages are given to introduce the reader to the general subject matter discussed herein and are not intended to limit the scope of the disclosed concepts. The following sections describe various additional embodiments and examples.

Figure 1:
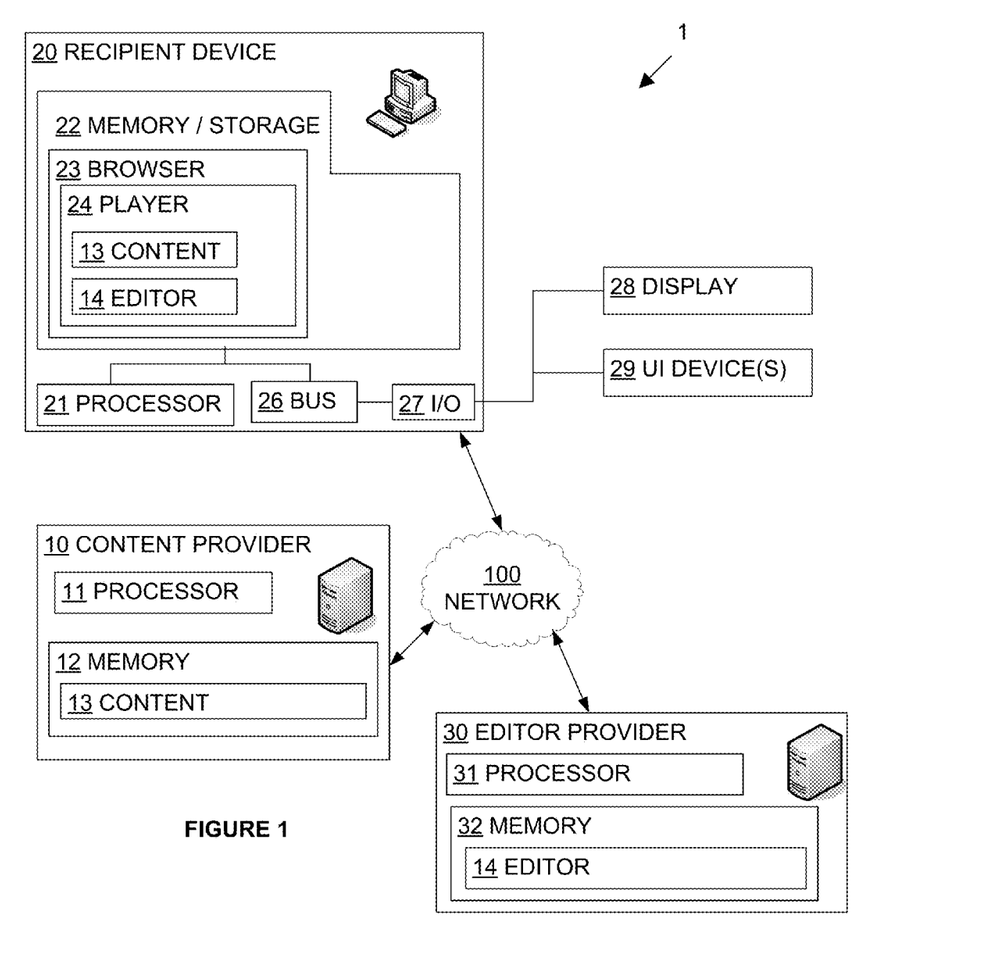
FIG. 1 is a system diagram illustrating an exemplary network and device configuration.

Referring now to the drawings in which like numerals indicate like elements throughout the several Figures, FIG. 1 is a system diagram illustrating an exemplary network and device configuration 1. Other embodiments may be utilized. The environment 1 shown in FIG. 1 comprises a wired or wireless network 100 connecting various network devices 10, 20, 30. Exemplary applications that execute on each of the devices 10, 20, 30 are shown as functional or storage components residing in memory 12, 22, 32 on the respective devices. The memory 12, 22, 32 may be transient or persistent. As is known to one of skill in the art, such applications may be resident in any suitable computer-readable medium and execute on any suitable processor. For example, the network devices 10, 20, 30 shown each may comprise a computer-readable medium such as a random access memory (RAM) 12, 22, 32 coupled to a processor 11, 21, 31 that executes computer-executable program instructions and/or accesses information stored in memory 12, 22, 32. Such processors may comprise a microprocessor, an Application Specific Integrated Circuit (ASIC), a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, a solid state drive (SSD), Flash memory or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The network 100 shown comprises the Internet. In other embodiments, other networks, intranets, combinations of networks, or no network may be used. The devices 10, 20, 30 can be connected to a network 100 as shown. Alternative configurations are of course possible. The devices 10, 20, 30 may also comprise a number of external or internal devices such as a mouse, a CD-ROM, DVD, a keyboard, a display, audio speakers, or other input or output devices. For example, recipient device 20 includes a display 28 and various user interface devices 29. The provider devices 10, 30 depicted as single computer systems, may be implemented as a network of computers, servers, or processors. Examples of a server device are servers, mainframe computers, networked computers, a processor-based device, and similar types of systems and devices.

This exemplary network and device configuration 1 is provided merely to illustrate potential configuration that can be used to implement certain embodiments. Other configurations may of course be utilized.

The techniques, methods, and systems described herein can be used in a variety of contexts. The following discussion uses a webpage content editor as an exemplary application for illustration only. Other types of applications can utilize the techniques, methods, and/or systems described herein. An exemplary webpage content editor is discussed merely as an example to help illustrate functions, benefits, and other attributes of various alternative elements and embodiments.

In the exemplary webpage content editor example, the editor provider 30 provides an editing application or editor 14 to the recipient device 20 to allow the recipient device to edit the contents of a web page, such as the content 13 of a web page that is provided by content provider 10. This exemplary editor 14 presents the to-be-edited webpage content 13 within a feature of the editing application, such as on a What You See Is What You Get (WYSIWYG) editing canvas, and also presents various editing features available through selection of various graphically-displayed icons and menus. A user can edit the content 13 in the editor 14. In one specific example, the editor 14 comprises an HTML node or container that is used to display the content 13 of the to-be-edited webpage. In one example, the editor 14 is used within a web browser so that the browser displays the to-be-edited webpage content 13 and the editor's various graphically-displayed icons and menus.

Figure 2A:
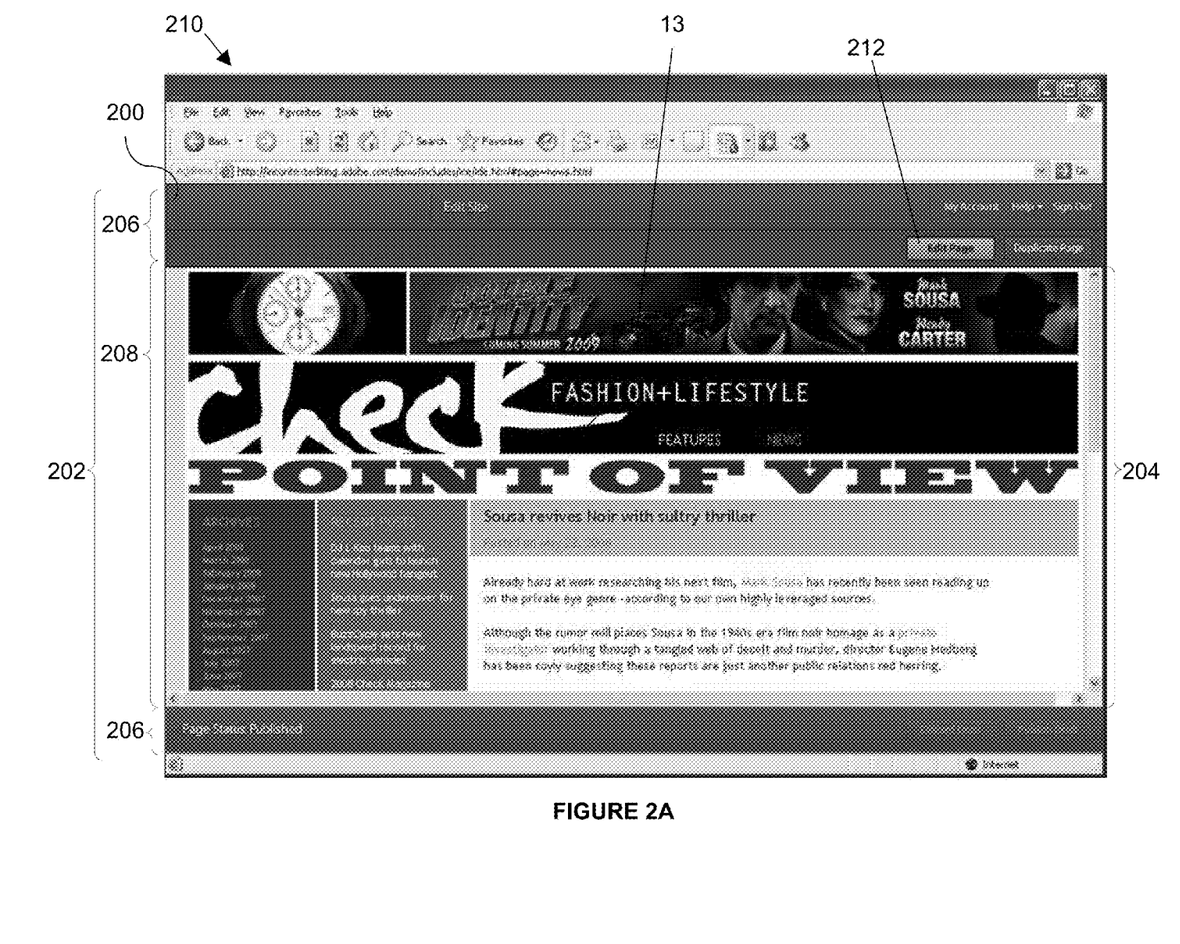
FIGS. 2A-C illustrate an exemplary interface for the exemplary editor of FIG. 1, displaying in different layers a portion with to-be-edited webpage content and a portion with various editor tools and information.
Figure 2B:
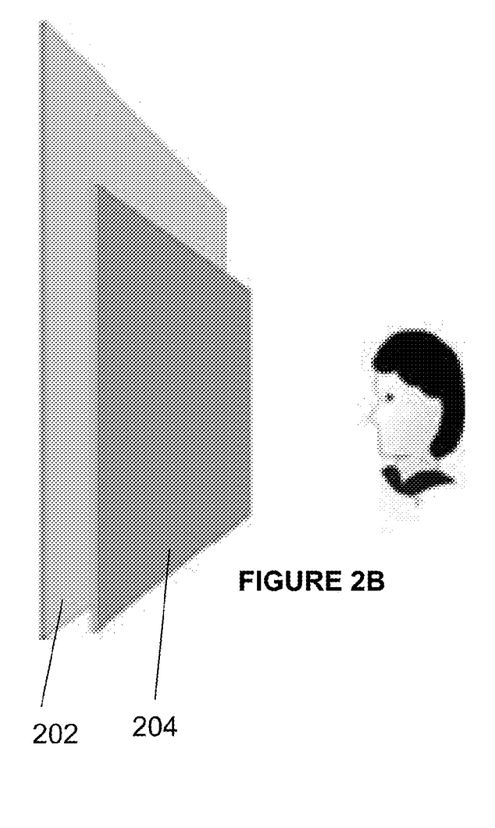
Figure 2C:
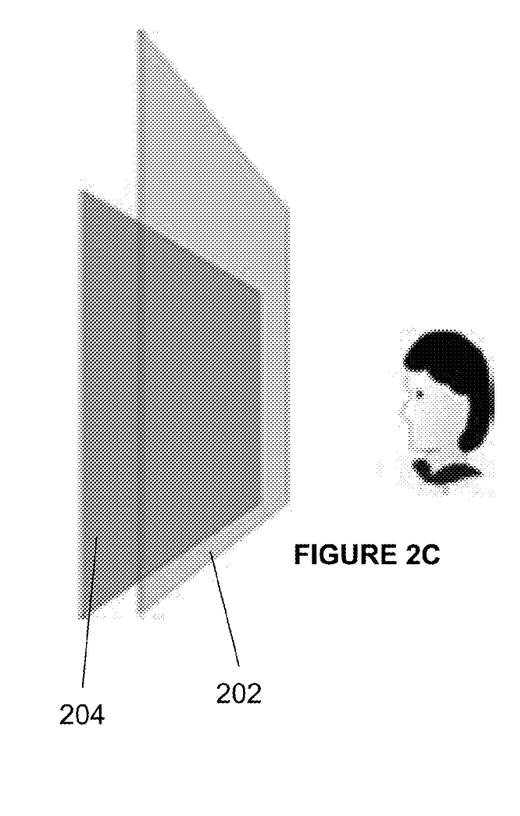

FIGS. 2A-C illustrates an exemplary interface 200 for the exemplary editor 14 of FIG. 1, displaying in different layers 202, 204 a portion with to-be-edited webpage content 13 and a portion with various editor tools and information 206. The exemplary interface 200 may, as it is here, be provided within a web browser 210. FIG. 2A is a screen shot illustrating editor interface 200. In FIG. 2B, the second layer 204 is active and is thus displayed in front of the first layer 202. Conversely, in FIG. 2C, the first layer 202 is active and is thus displayed in front of the second layer 204. Referring again to FIG. 2A, the interface 200 includes the various tools and information 206, such as edit page tool icon 212, on the first layer 202. The interface 200 also includes a transparent portion 208 on the first layer 202. The interface 200 includes the to-be-edited webpage content 13 on the second layer 204. In this example, the second layer 204 is sized and positioned to correspond to the size and position of the transparent portion 208. Accordingly, since the transparent portion 208 is transparent, the to-be-edited webpage content 13 is visible regardless of which layer 202, 204 is active. Thus, the to-be-edited webpage content 13 remains visible even when a user is interacting with features and tools provided through the various tools and information 206. These features and tools can thus be used in the context for which they are applicable, i.e., editing the to-be-edited content 13.

The to-be-edited webpage content 13 is displayed in an HTML viewer feature of the interface 200. A user is able to edit the content 13 and utilize the editing tools and information 206 as if the interactions were controlled by a single editing application even if the interface 200 delegates editing within the HTML viewer to the web browser 210. This example is provided to illustrate combination of content from different sources or frameworks that are combined into a single application. In some examples, an Adobe® Flash® application or other rich Internet application (RIA) content can be combined with HTML content into an application that has a single application feel. Content from other sources or frameworks including, but not limited to, javascript content, CSS, AJAX, database, and other static and interactive content and applications can also be combined using the techniques presented herein. Different frameworks, e.g., HTML and AJAX can be used seamlessly together within a single application, for example, by simply overlaying controls, using transparent portions, and/or positioning and sizing layers to provide a desired interaction or display of the content from the different frameworks. In certain embodiments, different technologies or frameworks that were not designed to work together can, in fact, be integrated together to provide a seamless integrated application.

A user interface of an application can include one, two, or more layers to implement various features. Sometimes the application may determine which of multiple layers to make active after each user interaction. After each such interaction, the application may, for example, if necessary, adjust the state of the application to change which layer is active. For example, a user may right click above an item on the to-be-edited content 13 and be presented with a menu associated with the first layer.

The exemplary interface 200 can be provided as a web page in a browser. This web page can, in an exemplary embodiment, be provided as a HTML page containing two sibling HTML nodes: one defining a first layer 202 (i.e., an Adobe® Flash® movie) and one containing the to-be-edited content 204, such as a web page. Using absolute positioning, the browser can be forced to display these layers 202, 204 on top of one another (at specific positions so that the second layer 204 fits exactly in a transparent portion 208 of the first layer 202), and using z-index (a property which defines the depth of the display), one or the other of the layers 202, 204 can be made active (i.e., closer to the user).

Figure 3:
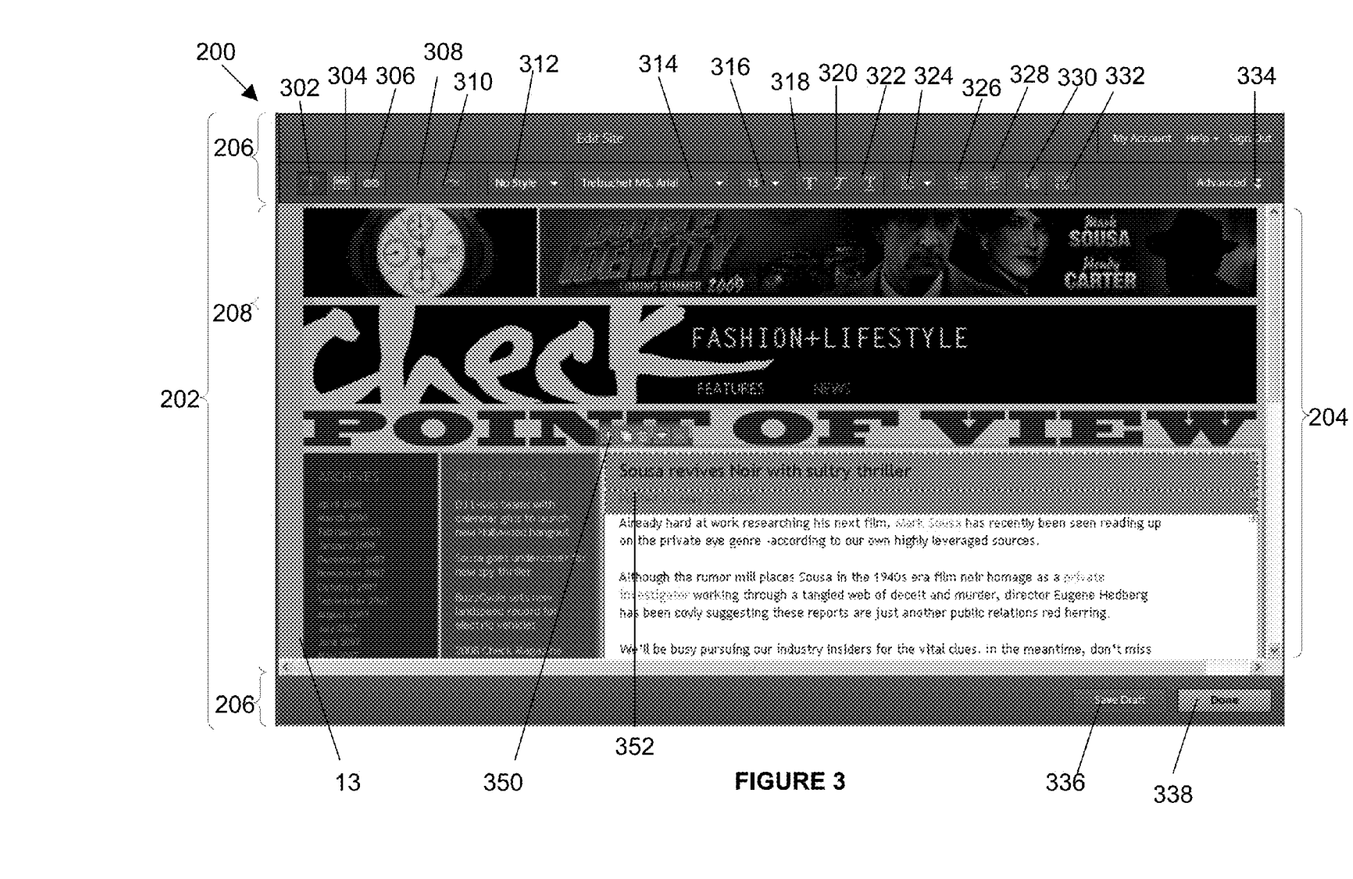
FIG. 3 illustrates a screen shot of a second view of the interface of FIG. 2A.

FIG. 3 illustrates a screen shot of a second view of the interface 200 of FIG. 2A. The user interface 200 provides various editing tools 302, 304, 306, 308, 310, 312, 314, 316, 318, 320, 322, 324, 326, 328, 330, 332, 334, 336, 338 in the first layer 202 of the application. In this example, all of the editing application features are placed on the first layer. The content 13 on the second layer 204 is presented for editing. As shown in FIG. 3, elements 352 of the content 13 have been selected and a menu 350 with various editing commands is displayed. This menu 350, for example, can be injected into HTML code of content 13 which resides in the second layer 204. With the second layer active, the content 13 is directly available for editing and the user is able to utilize the tools of the menu 350. When needed, the application can instantly switch to make the first layer active.

Figure 4:
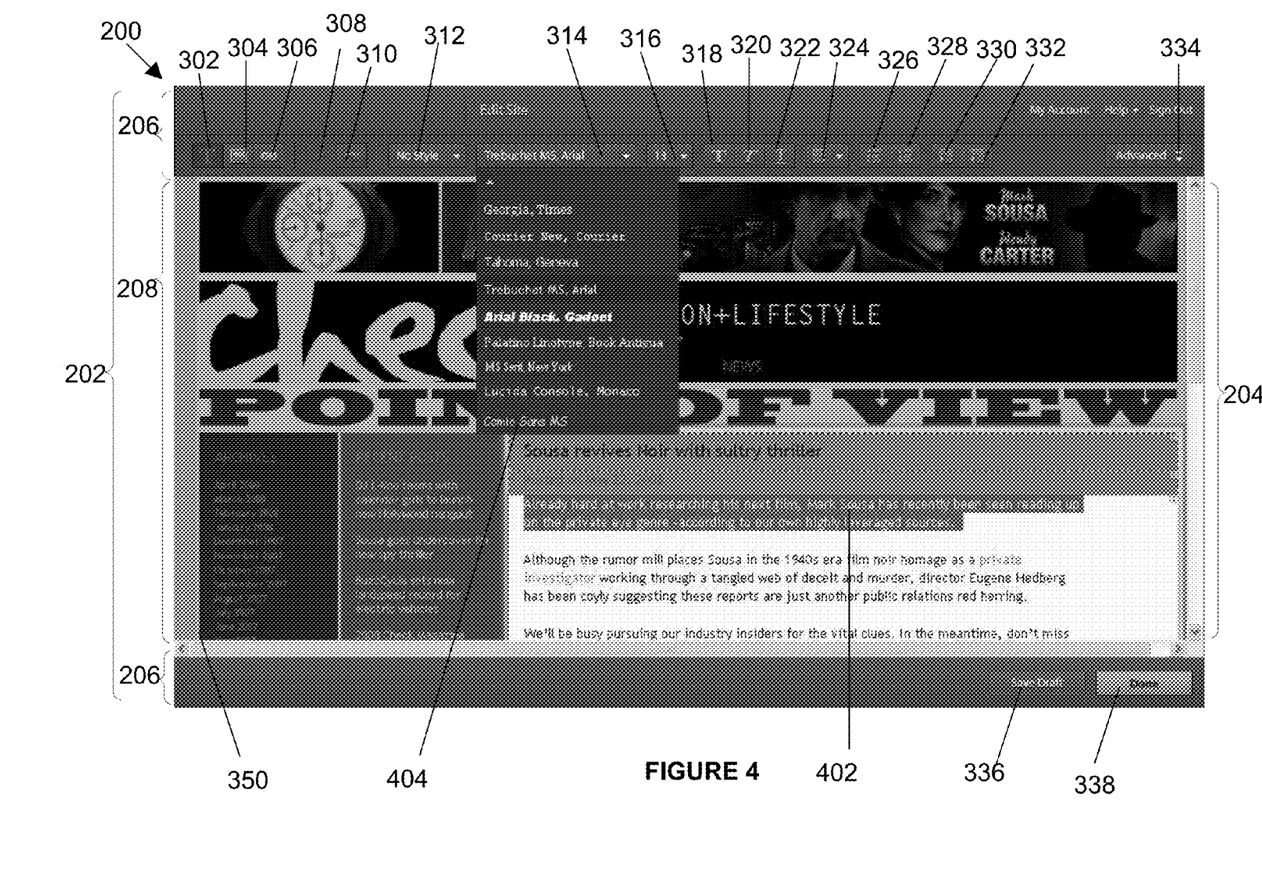
FIG. 4 illustrates a screen shot of a third view of the interface of FIG. 2A.

FIG. 4 illustrates a screen shot of a third view of the interface of FIG. 2A. In this example, elements 402 of the content 13 have been selected and the user has clicked on the font tool 314. In response to the user clicking on the font tool 314, the user interface 200 displays a menu 404 with various editing commands. Such a menu can be a modal dialog, meaning that the user is restricted from doing anything else until the dialog is closed. This menu 404 is provided as part of the first layer and part of the menu 404 displays in the transparent portion 208 of the first layer. This partial overlay improves the integrated, single application appearance of the content 13 and the various editing tools 302, 304, 306, 308, 310, 312, 314, 316, 318, 320, 322, 324, 326, 328, 330, 332, 334, 336, 338.

Figure 5:
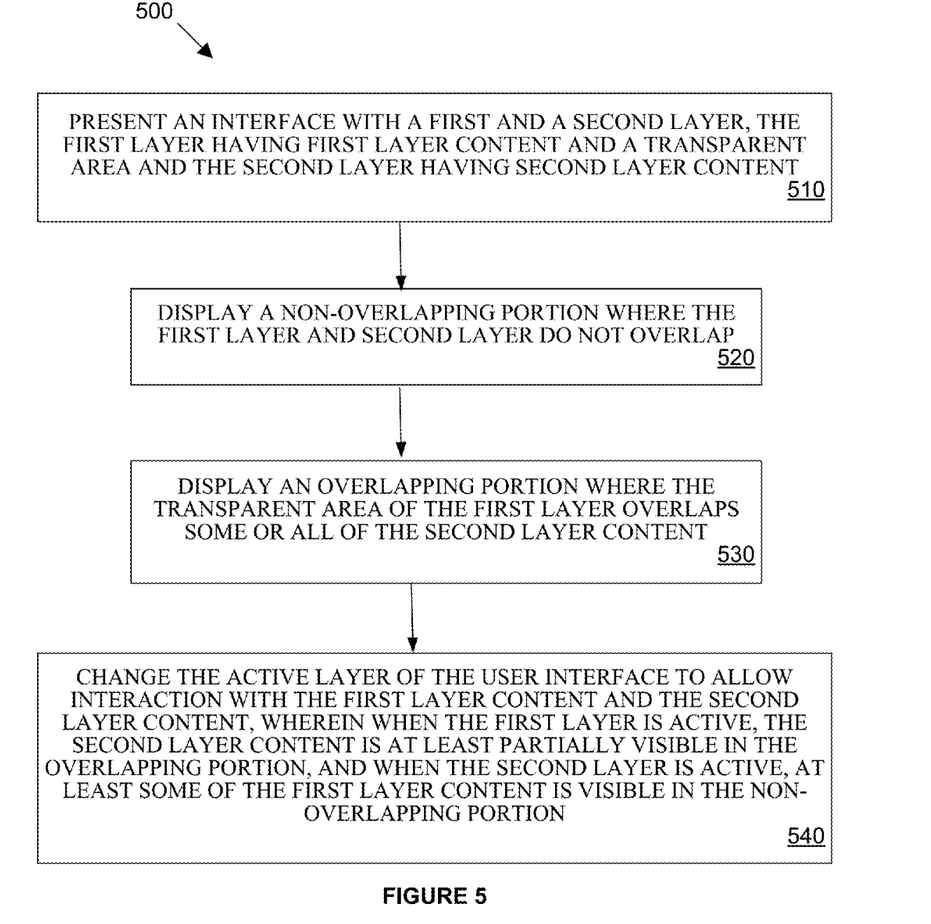
FIG. 5 illustrates a flow chart of an exemplary method for providing an application.

FIG. 5 illustrates a flow chart of an exemplary method 500 for providing an application. The exemplary method 500, as shown in block 510, presents a multi-layer interface comprising a first layer and a second layer, wherein the first layer comprises first layer content and a transparent area and the second layer comprises second layer content. The layers may correspond to content provided from two different sources or frameworks. For example, the first layer may comprise components provided for a Adobe® Flash® application and the second layer may comprise HTML content that is accessed by an HTML container within that Adobe® Flash® application. Components and other types of content provided on either layer may be static or interactive content. An example of presenting a multi-layer interface is provided in FIG. 3 which shows first layer and a second layer, wherein the first layer comprises first layer content and a transparent area and the second layer comprises second layer content. In FIG. 3, for example, the first layer 202 comprises content such as the various editing tools 302, 304, 306, 308, 310, 312, 314, 316, 318, 320, 322, 324, 326, 328, 330, 332, 334, 336, 338. In FIG. 3, the first layer 202 also comprises a transparent area shown at transparent portion 208. The second layer 204 in FIG. 3 comprises content shown as to-be-edited webpage content 13.

The method 500 further comprises displaying the interface with a non-overlapping portion where the first layer and second layer do not overlap, as illustrated in block 520. An example of this is also illustrated in FIG. 3. In FIG. 3, the first layer 202 portion comprising the various tools and information 206 does not overlap with the second layer 204 portion of the interface.

The method 500 similarly further comprises displaying an overlapping portion where the transparent area of the first layer overlaps some or all of the content of the second layer, as shown in block 530. An example of this is also illustrated in FIG. 3. In FIG. 3, the first layer 202 transparent portion 208 overlaps some or all of the content 13 of the second layer 204. In this particular example, the content 13 spans the entire second layer 204. In other embodiments, the second layer can comprise additional and/or different types of content. In one embodiment, a second layer comprises multiple interactive content areas. In another embodiment, a second layer displays interactive content and static content together. Other embodiments, comprise other combinations of differing content and content types.

The method 500 further comprises changing the active layer of the interface to allow interaction with the first layer content and the second layer content, wherein, when the first layer is active, the second layer content is at least partially visible in the overlapping portion, as shown in block 540. For example, if the first layer 202 of FIG. 4 is active, the interactive application content 13 is at least partially (in this example, entirely) visible through the overlapping portion where the transparent portion 208 of the first layer 202 is displayed.

As further shown in block 540, the method 500 further comprises changing the active layer of the interface to allow interaction with the first layer content and the second layer content, wherein when the second layer is active, at least some of the first layer content is visible in the non-overlapping portion. For example, if the second layer 204 shown in FIGS. 2A and 3, is active, the various editing tools 302, 304, 306, 308, 310, 312, 314, 316, 318, 320, 322, 324, 326, 328, 330, 332, 334, 336, 338 of the first layer 202 are still visible in a non-overlapping portion of the interface. Each of the various editing tools 302, 304, 306, 308, 310, 312, 314, 316, 318, 320, 322, 324, 326, 328, 330, 332, 334, 336, 338 can be accessed by a user. Upon such access, the application can decide which layer to make active. For example, which layer to make active may be determined based on a determination of whether the result needs to display something in the transparent area 208 of the first layer.

Generally, features from various sources and frameworks can be integrated into a application with features from each given source or framework provided on a different layer of the application. By positioning and sizing the layers and/or including transparent portions in one or more layers, the features can be presented simultaneously. In addition, the application can switch seamlessly making an appropriate layer active so that the user experiences the different layers without noticing that the features are from different sources or frameworks. Additionally, as illustrated in FIG. 4, the use of a transparent portion in a multi-layer application allows controls from one layer (e.g., associated with a particular source or execution framework) to expand on top of content from the other layer (e.g., associated with a different source or execution framework) so that the content appears well integrated. While these techniques have certain particular advantages with respect to adding a toolbar, menu, or other features to an existing HTML page, aspects disclosed herein have uses in a variety of other contexts as well.

GENERAL

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
presenting an interface associated with an application on a computing device, the computing device comprising instructions embodied in a computer-readable medium which configure the computing device to display the interface, the interface comprising a first layer and a second layer, wherein the first layer comprises first layer content and a transparent area, the first layer content comprising content from a first source external to the application, wherein the second layer comprises second layer content in a content area, the second layer content comprising another content from a second source external to the application and different from the first source, the content area corresponding to the transparent area with respect to shape, size, and position, and wherein the application is configured to provide one or more controls from the first layer content and associated with the first source to perform one or more operations on the another content of the second source in the second layer content;
displaying a non-overlapping portion of the interface where the first layer and second layer do not overlap, the non-overlapping portion comprising at least the first layer content;
displaying an overlapping portion of the interface where the transparent area of the first layer overlaps the content area of the second layer, the overlapping portion comprising at least the second layer content;
in response to the first layer becoming active, changing the interface such that the first layer content is visible and, through the transparent area, the second layer content is visible; and
in response to the second layer becoming active, changing the interface such that the second layer content is visible and obstructs a presentation of the transparent area at the interface, and such that the first layer content is visible in the non-overlapping portion of the interface.

2. The method of claim 1, wherein the interface is provided as a web page in a browser, wherein the web page is provided as a hypertext markup language (HTML) page containing two HTML nodes: one for the first layer content and one for the second layer content.

3. The method of claim 2, wherein the web page uses absolute positioning to force the browser to display the first layer and the second layer at specific positions so that the second layer fits exactly in the transparent area.

4. The method of claim 3, wherein the web page uses a z-index to make either the first layer or the second layer active.

5. The method of claim 1, wherein, when the first layer is active, all of the first layer content is visible.

6. The method of claim 1, wherein, when the second layer is active, the one or more controls of the first layer from the non-overlapping portion can be accessed to perform the one or more functions on the another content in the second layer content.

7. The method of claim 1, wherein the second layer content is interactive content and the first layer content comprises components providing for editing the second layer content.

8. The method of claim 1, wherein the application is configured to perform the operation on the another content in the second layer content based on a selective activation of the first layer and the second layer.

9. The method of claim 1, wherein:
in response to the second layer becoming active, receiving a user selection of an item from the second layer content to be edited;
determining whether to activate the first layer to edit the item;
in response to determining that the first layer is to remain inactive, maintain the second layer in an active state, present an option in the non-overlapping portion of the first layer content to edit the item, and maintain the obstruction of the presentation of the transparent area, the option presented; and
in response to determine that the first layer is to be activated, stop the obstruction of the presentation of the transparent area, present the option in the transparent area to edit the item, and obstruct an overlapping area of the second layer content corresponding to a presentation area of the option in the transparent area.

10. The method of claim 1, further comprising: in response to receiving a user selection of an item from the second layer content, selecting between the first layer and the second layer for activation based on an operation to be performed on the item according to the user selection, wherein activating the selected layer causes the application to perform the operation on the item.

11. A computer-implemented method comprising:
presenting an interface associated with an application on a computing device, the computing device comprising instructions embodied in a computer-readable medium which configure the computing device to display the interface, the interface comprising a first layer and a second layer, wherein the first layer comprises components and a transparent area, the components comprising content from a first source external to the application, wherein the second layer comprises interactive content in a content area, the interactive content associated with a second source external to the application and different from the first source, the content area corresponding to the transparent area with respect to shape, size, and position, wherein the application is configured to provide one or more controls from the components of the first layer and associated with the first source to perform one or more operations on the interactive content of the second source in the content area, wherein the interface comprises a non-overlapping portion where the first layer and second layer do not overlap and comprising the components and the interface further comprises an overlapping portion where the transparent area of the first layer overlaps the content area of the second layer, the overlapping portion comprising at least the content area;
upon receiving an interaction with the interface making the first layer active such that the components are visible and, through the transparent area, the interactive content is visible; and
upon receiving an interaction with the interface, making the second layer active such that the interactive content is visible and obstructs a presentation of the transparent area and such that the components are visible in the non-overlapping portion of the interface.

12. The computer-implemented method of claim 11, wherein the interaction making the first layer active causes a first component of the first layer to display at a location that partially overlaps the interactive content displayed through the transparent portion, wherein interactive content that is not partially overlapped remains visible.

13. The computer-implemented method of claim 12, wherein the first component further overlaps at least a portion of the non-overlapping portion.

14. The computer-implemented method of claim 12, wherein the first component is a dialog box.

15. A system comprising:
   instructions embodied in a non-transitory computer-readable medium which configure a computing device to display an interface associated with an application, the interface comprising a first layer and a second layer, wherein the first layer comprises first layer content and a transparent area, the first layer content comprising content from a first source external to the application, wherein the second layer comprises second layer content in a content area, the second layer content comprising another content from a second source external to the application and different from the first source, the content area corresponding to the transparent area with respect to shape, size, and position, wherein the application is configured to provide one or more controls from the first layer content and associated with the first source to perform one or more operations on the another content of the second source in the second layer content, wherein at a non-overlapping portion of the interface the first layer and second layer do not overlap and at an overlapping portion of the interface the transparent area of the first layer overlaps the content area of the second layer, the non-overlapping portion comprising at least the first layer content, the overlapping portion comprising at least the second layer content;
   instructions embodied in a computer-readable medium which configure the computing device to, in response to the first layer becoming active, change the interface such that the first layer content is visible and, through the transparent area, the second layer content is visible; and
   in response to the second layer becoming active, changing the interface such that the second layer content is visible and obstructs a presentation of the transparent area at the interface, and such that the first layer content is visible in the non-overlapping portion of the interface.

16. The system of claim 15, wherein:
   the interface is provided as a web page in a browser, wherein the web page is provided as a hypertext markup language (HTML) page containing two HTML nodes: one for the first layer content and one for the second layer content;
   the web page uses absolute positioning to force the browser to display the first layer and the second layer at specific positions so that the second layer fits exactly in the transparent area; and
   the web page uses a z-index to make either the first layer or the second layer active.

17. The system of claim 15, wherein the first layer and the second layer each correspond to content that is executed according to a different execution framework.

18. The system of claim 15, wherein the first layer content comprises components for editing the second layer content.

19. A non-transitory computer-readable medium on which is encoded program code, the program code comprising:
   program code for presenting an interface associated with an application on a computing device, the computing device comprising instructions embodied in a computer-readable medium which configure the computing device to display the interface, the interface comprising a first layer and a second layer, wherein the first layer comprises first layer content and a transparent area, the first layer content comprising content from a first source external to the application, wherein the second layer comprises second layer content in a content area, the second layer content comprising another content from a second source external to the application and different from the first source, the content area corresponding to the transparent area with respect to shape, size, and position, and wherein the application is configured to provide one or more controls from the first layer content and associated with the first source to perform one or more operations on the another content of the second source in the second layer content;
   program code for displaying a non-overlapping portion of the interface where the first layer and second layer do not overlap, the non-overlapping portion comprising at least the first layer content;
   program code for displaying an overlapping portion of the interface where the transparent area of the first layer overlaps the content area of the second layer, the overlapping portion comprising at least the second layer content;
   program code for, in response to the first layer becoming active, changing the interface such that the first layer content is visible and, through the transparent area, the second layer content is visible; and
   program code for, in response to the second layer becoming active, changing the interface such that the second layer content is visible and obstructs a presentation of the transparent area at the interface, and such that the first layer content is visible in the non-overlapping portion of the interface.

20. The computer readable medium of claim 19, wherein:
   the interface is provided as a web page in a browser, wherein the web page is provided as a hypertext markup language (HTML) page containing two HTML nodes: one for the first layer content and one for the second layer content;
   the web page uses absolute positioning to force the browser to display the first layer and the second layer at specific positions so that the second layer fits exactly in the transparent area; and
   the web page uses a z-index to make either the first layer or the second layer active.

* * * * *